Sept. 20, 1966 L. W. DAVEE 3,273,953
MOTION PICTURE PROJECTOR FILM FOCUS STABILIZATION AND
LENS COOLING MEANS
Filed Feb. 26, 1965 2 Sheets-Sheet 1
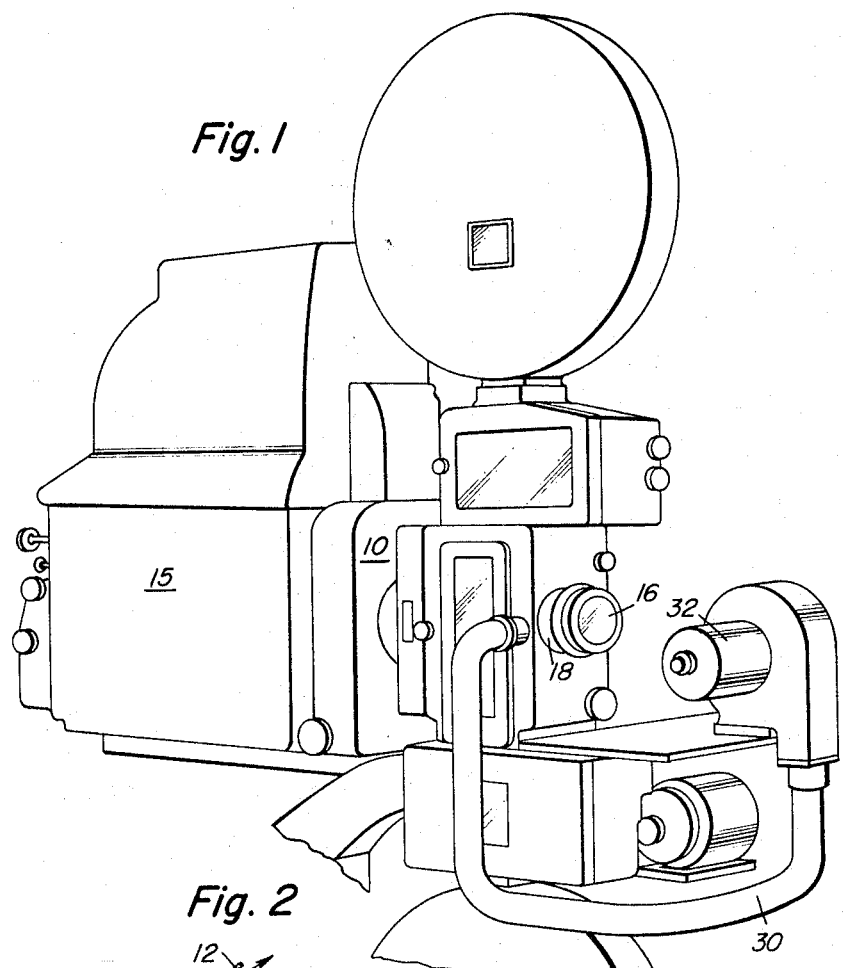
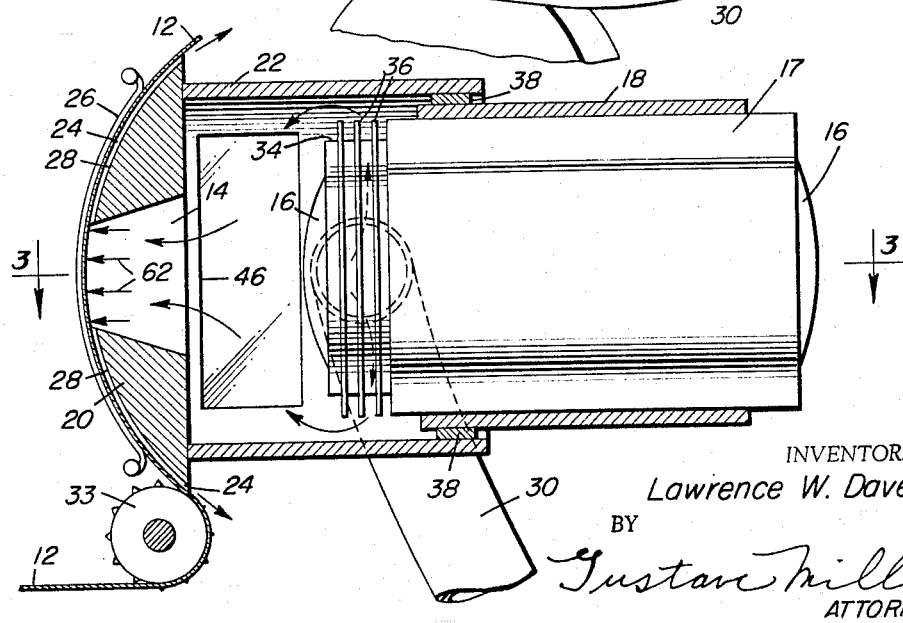
INVENTOR.
Lawrence W. Davee
BY
Gustave Miller
ATTORNEY

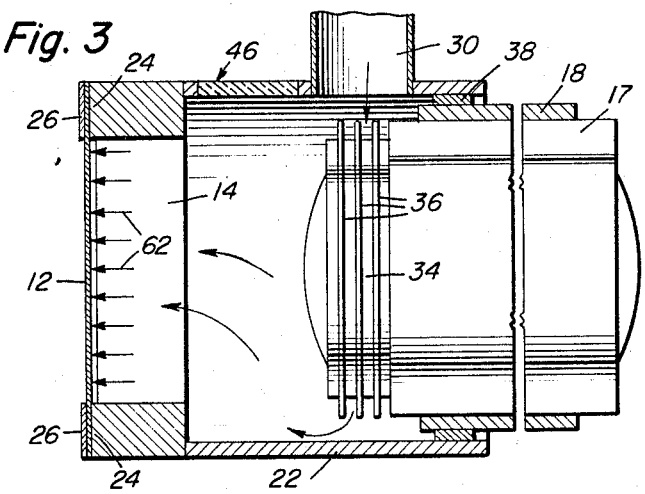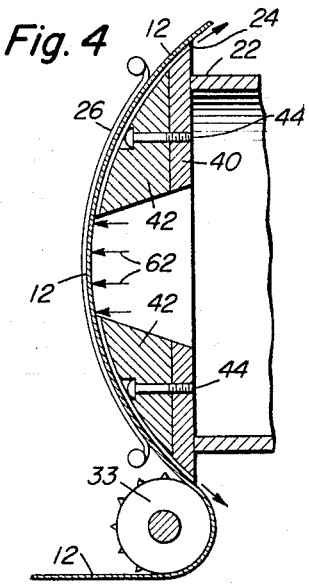

United States Patent Office 3,273,953
Patented Sept. 20, 1966

3,273,953
MOTION PICTURE PROJECTOR FILM FOCUS STABILIZATION AND LENS COOLING MEANS
Lawrence W. Davee, 153 Westervelt Ave., Tenafly, N.J.
Filed Feb. 26, 1965, Ser. No. 435,425
22 Claims. (Cl. 352—222)

This invention relates to a motion picture projector film focus stabilization and film and lens cooling means, and has for an object to provide an improved means and method of stabilizing the focus or eliminating film focus drift of film feeding through the film gate of a motion picture film gate and simultaneously providing a cooling effect both to the feeding film as well as to the lens and lens mount of the projector, such cooling effect being in addition to any other cooling effect already provided by conventional means, if such conventional cooling means be already present.

A further object of this invention is to eliminate film focus drift and thus stabilize the focus of film by providing a uniform pressure, which is different from atmospheric pressure, to one side of film feeding through a motion picture projector curved film gate, wherein the surface of the film feeding past the light aperture in the film gate is subject to uniform pressure, wherein the pressure on the film passing the film gate light aperture is uniformly higher on the concave side than the convex side of the film.

A further object of this invention is to provide a pressure chamber extending from the film gate to about the lens barrel and to provide a uniform pressure differential between the chamber and the atmosphere, which pressure differential is maintained by a pressure source, either positive or negative, to the chamber while leaking air pressure between the chamber and the atmosphere along the surface of the film feeding to and from the light aperture along the film gate shoes.

Motion picture film is made and projected in various sizes, from 8 mm. through 16 mm., 35 mm. and 70 mm. and maybe even larger, and the larger the film size the more critical and the more difficult it is to prevent film feeding past the film gate light aperture from buckling, fluttering or otherwise moving out of the critical focus position as the projection light rays travel through the film to and through the lens and lens barrel in the lens mount, such tendency to diverge from the proper focal position being intensified by the heat of the light rays passing therethrough. Thus, the greater the film size, the greater is the problem of stabilizing the film focus, and incidentally the problem of removing the heat produced by the light rays, and this invention has the object of solving this problem, both of stabilizing the film focus and of incidentally cooling not only the film but also the lens and lens barrel.

It is an object of this invention to solve this problem by providing a means of providing uniform pressure by providing a pressure chamber extending from the film gate to about the lens mount, providing the lens barrel with cooling fins on a neck extending to within the chamber and thus exposed to the pressure in the chamber, and maintaining the uniform pressure in the chamber, and means for providing a continuous change of air in the chamber while leaking air between the chamber and the atmosphere along the surface of the feeding film through a throat on each side of the film gate light aperture. The pressure in the chamber may be either positive, that is above atmospheric pressure, or negative, that is, a partial vacuum or less than atmospheric pressure, and the higher pressure is provided on the concave surface of the film as it feeds past the film gate light aperture.

The essence of this invention is to provide air pressure onto the film which has been curved by being held with suitable film trap spring shoes against curved gate shoes on the film gate. The positive pressure is exerted on the concave side of the curved feeding film, thereby pressing the film into the curve where it will be retained without noticeable film flutter during the projection cycle. The pressure is provided by a pressure supply connected to the pressure chamber so as to provide moderate but uniform pressure on the film that is feeding past the light aperture in the film gate. This uniform pressure is quite different than merely providing a blast or jet of air impinging on the film, which air blast or jet will cause film flutter, and not eliminate flutter, as does the moderate uniform pressure of this invention. The moderate uniform pressure of this invention. The moderate uniform pressure of this invention stabilizes the film, even though 70 mm. or more in size, in proper focal position and eliminates both flutter and buckle, and even tends to straighten out buckle which may be present in the film from being projected previously in conventional projectors. A cooling effect is necessarily present, both on the film and the lens mount and lens, and such cooling effect is enhanced by providing a finned neck on the end of the lens barrel extending within the pressure chamber. Uniform pressure in the chamber is maintained by a pressure source and by the throats between the film and the surface of the film gate, through which throats air pressure is leaked between atmosphere and the pressure chamber, the film passing through these throats on both sides of the film gate light aperture riding on a cushion of air, and due to the curvature of the film as caused by the curved film gate shoes and film trap spring shoes is thus maintained away from the surface of the film gate to avoid scratching.

In brief, the invention consists in the means of providing a pressure chamber with a transparent film viewing window in a motion picture projector, the pressure chamber extending from the film gate to about the lens mount, the chamber having an aperture aligned with the light aperture in the film gate, providing sealing means, providing cooling fins on the neck of the lens barrel extending into the pressure chamber so that the lens barrel and lens are also cooled by the air in the pressure chamber in addition to any conventional cooling means already present, providing a means for producing and maintaining an air pressure, different from atmospheric pressure, providing a film gate surface of a uniform transverse height from the film feeding through the film gate on its curved film gate shoes, leaking air between the pressure chamber and the atmosphere via the uniform transverse aperture between the feeding film and film gate. The positive or greater pressure is provided on the concave side of the curved film gate, and thus the pressure chamber may have pressure greater than atmospheric, with the concave side of the film on the chamber side of the film gate, or may be a partial vacuum, with the concave side of the feeding film on the atmospheric side of the feeding film. The surface of the film gate between the curved film gate shoes, which is normally flat, is curved preferably with a curve similar to that of the conventional curved film gate shoes, and is of the desired uniform transverse distance below the curved gate shoes. In new manufacture this curved film gate surface is provided initially; in existing film gates, filler plates of appropriate size and shape are added to provide a proper sized and shaped throat between the feeding film and the film gate between its curved gate shoes.

With the above and related objects in view, this invention consists in the details of construction and combination of parts, as will be more fully understood from the following description, when read in conjunction with the accompanying drawing, in which:

FIG. 1 is a perspective view of a movie film projector with this invention in operative position thereon.

FIG. 2 is a sectional view through the lens barrel mount and pressure chamber of this invention.

FIG. 3 is a sectional view on line 3—3 of FIG. 2.

FIG. 4 is a view similar to FIG. 2, but showing filler plates on conventional curved gate shoes.

FIG. 5 is a sectional view through the lens barrel mount of a vacuum chamber form of this invention.

FIG. 6 is a sectional view on line 6—6 of FIG. 5.

There is shown at 10 in general a motion picture projector in which this invention has been incorporated. The film 12 is being fed by intermittent sprockets 33 and projected by means of light rays from a conventional light source 15 through the film gate light aperture 14 and through the lens 16 of the lens barrel 17 in the lens mount 18 to be projected onto a viewing screen. This invention has to do with providing uniform pressure on the concave side of the film 12 that is feeding past the light aperture 14 in the curved film gate 20. The larger the film size is, the more difficult it is to maintain the film passing the light aperture in proper focus. This invention stabilizes the focus of the film feeding past the light aperture 14 by providing a pressure chamber 22 extending from the film gate 20 to about the inner end portion of lens barrel 17 and lens mount 18.

The longitudinal edges of the film travel on the two curved film gate shoes 24, being held thereagainst by the usual film gate spring trap shoes 26. In the conventional projector, the film gate is normally flat on the side toward film feeding thereby, but in this invention, this side is curved at 28 concentrically with the curved film gate shoes 24, the uniform transverse height between the gate shoes 24 and the feeding film providing two throats, one on each side of the light aperture 14. A convenient pressure source, here shown as a rotary pump 32, is connected by a conduit 30 into one side of the pressure chamber 22, the conduit being comparatively as large as possible so as to keep the velocity of the incoming air as low as possible consistent with maintaining the desired moderate pressure within the chamber 22.

In this form of the invention, the pressure is positive, that is, greater than atmospheric pressure, and air from the pressure chamber 22 escapes through the light aperture 14 through the two throats between the film gate surfaces 28 and the surface of the film 12 being fed intermittently therethrough by the conventional intermittent film feed sprockets 33.

The pressure maintained in the chamber 22 is moderate, being approximately equal to 1.2 inches of water, that is approximately one fifth of a pound per square inch of pressure. Higher pressure still works satisfactorily, so that it is not difficult to maintain satisfactory pressure while in operation in the theater. The essence of the invention is that the pressure would be maintained sufficiently to provide a uniform pressure on the film 12 feeding through the light aperture 14 and in the film feeding throats to the atmosphere. It is this uniform and comparatively moderate pressure that stabilizes the focus of the film as it feeds past the light aperture 14 and prevents film flutter and eliminates any buckling of the film 12 as it feeds through the throats and past the light aperture 14. It has been found to also stabilize any buckle that may already be present in the film from having been projected through conventional projectors lacking this invention.

The air pressure in chamber 22 also has a cooling effect on the feeding film that it contacts, and in addition, it has a cooling effect on the lens 16, lens barrel 17 and lens amount 18 as it enters the chamber 22 from the conduit 30, it being noted that the path of the incoming air leads about a reduced neck 34 on the lens barrel 17, the reduced neck 34 on the lens barrel 17 being also provided with heat radiating, cooling fins 36 to increase the cooling effect. The path of the incoming air also leads about the inside end of the lens 16, and thus also provides a cooling effect to the lens. It will be noted that this cooling effect to the lens 16, lens barrel 17 and lens mount 18 is in addition to any conventional lens, lens barrel and lens mount cooling means conventionally provided, and is not intended as a substitute for the conventional cooling means, not shown, which may also be present. This cooling effect is an incidental but important part of this invention, but the primary essence of this invention is that the uniform pressure provided on the concave side of the film stabilizes its focus as it passes the light aperture 14.

The chamber 22 is substantially pressure tight except at the light aperture 14, and sealing pads, such as sponge rubber pads 38, are provided where needed, such as about the aperture through which the lens mount 18 adjustably extends into the chamber 22 and is held with the lens 16 and lens barrel 17 in alignment with the light aperture 14. As shown in FIG. 2, the surface of the film 12 on the side feeding past the light aperture 14 is concave in longitudinal direction (the direction of the feeding of the film 12) and is straight transversely, as shown in FIG. 3. With this form, the pump 32 is a positive pressure providing pump, and the pressure inside the chamber 22 is higher than atmospheric pressure.

Presently existing projectors usually have a film gate 40 having a flat side on the side between its curved film gate shoes 24. To convert such film gates to the present purpose, filler plates 42 are secured thereon by screws 44 or otherwise, as shown in FIG. 4, so as to provide the same transversely uniform curved sides to provide a throat of uniform transverse height with the surface of the film feeding thereby. In addition the same pressure chamber 22 and its pressure conduit 30 and pump 32 are also provided. In both cases, the chamber 22 is provided with a transparent window 46 permitting the film gate, gate aperture and other parts therein to be viewed by the operator when desirable.

In the foregoing forms of this invention, positive pressure is provided in the pressure chamber 22 so as to exert pressure on the concave side of the feeding film, the concave side of the film being toward the lens 16 and away from the light source. However, the concavity of the film gate 50 and its film gate shoes 52 may be made to be on the side toward the light source and away from the lens 16, as shown in FIGS. 5 and 6, with the correspondingly curved film gate spring trap shoes 54 holding the feeding film 12 as it is fed by the intermittent sprockets 56 past the light aperture 48. A negative pressure, or partial vacuum pressure chamber 58 is here provided between the film gate 50 and about the lens barrel 17 with the same sealing sponge rubber pads 38 to prevent atmospheric pressure leaking in except through the throats and light aperture. The first form of invention has pressure leaking from the chamber 22 to the atmosphere in the throats between the feeding film and the curved film gate, but in this case, the atmospheric pressure leaks through the throats between the film gate 50 and the feeding film through the film gate light aperture 48 into the partial vacuum chamber 58, then about the cooling fins 36 of the barrel neck 34 and out the conduit 60 to a suitable vacuum pump, possibly identical with that shown conventionally at 32, but connected to suck air from the conduit 60 and pump it into the atmosphere.

As shown by the pressure arrows 62, the positive or greater pressure is always provided on the concave side of the feeding film and the pressure leaking through the throats between the film gate and the feeding film also provides a cooling effect and also a cushion preventing scratching contact between the film surface and the film gate throat surface. The air from the throats in FIGS. 5 and 6 enters through the film gate light aperture 48 into the vacuum chamber 58. There is the same moderate difference in pressure between the atmospheric pressure and the pressure in the partial vacuum pressure chamber 58 as there is between pressure chamber 22 and the atmosphere. It is this moderate generally uniform pressure difference, on the concave side of the feeding film, that stabilizes the film focus, and it is the air passing through the chamber 22 or 58 that provides the incidental but important additional cooling effect.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. Film focus stabilizing means in a motion picture projection apparatus having a curved film gate having a light aperture therethrough, means for intermittently feeding the film along curved film gate shoes extending longitudinally on opposite edges of said film gate and past the light aperture, and film gate spring trap shoes maintaining the longitudinal opposite side edges of the feeding film against said curved film gate shoes and past said light aperture; said stabilizing means comprising a pressure chamber including said curved film gate and the film in said light aperture as one wall thereof, means for continuously providing a generally uniform air pressure in said pressure chamber against substantially the entire surface of the film in said light aperture, said pressure chamber being open to the atmosphere only through said light aperture and along the throats provided by the surface of the feeding film between said curved film gate shoes, the inner sides of the curved film gate shoes, and the film gate surface.

2. The film focus stabilizing means of claim 1, the transverse height of said throats being uniform.

3. The film focus stabilizing means of claim 2, the surface of said film gate between said inner sides of said film gate shoes being curved along the path of the film feeding along the curved film gate shoes.

4. The film focus stabilizing means of claim 3, the curvature of said film gate surface being concentric with the curvature of said curved film gate shoes.

5. The film focus stabilizing means of claim 4, said uniform transverse height being provided by filler plates secured on said film gate surface between said curved film gate shoes.

6. The film focus stabilizing means of claim 1, the pressure in said pressure chamber being greater than atmospheric pressure.

7. The film focus stabilizing means of claim 1, the pressure in said pressure chamber being less than atmospheric pressure.

8. The film focus stabilizing means of claim 1, the pressure on the concave surface of the feeding film being greater than the pressure on its opposite surface.

9. The film focus stabilizing means of claim 2, the pressure difference between the pressure chamber and the atmosphere leaking through said throats.

10. The film focus stabilizing means of claim 1, said pressure chamber having pressure enclosing walls connected to said film gate about said light aperture therein, said chamber walls having a lens mount receiving aperture aligned with said film gate light aperture, lens mount pressure sealing means to hold a lens mount extending through said lens mount receiving aperture, a projection lens and projection lens barrel in said lens mount having an end portion extending into said pressure chamber, said chamber wall between said film gate and said lens mount sealing means having a pressure conduit connected therethrough and directing a pressure maintaining air current extending about said inner end portion of said projection lens barrel.

11. The film focus stabilizing means of claim 10, said inner end portion of said projection lens barrel having a reduced neck extending into said chamber, and fin means on said reduced barrel neck, the diameter of said fin means being no greater than the diameter of the lens barrel receiving aperture in said lens mount.

12. In an apparatus for removing heat from the projection lens barrel of a motion picture projector having a curved film gate and a light aperture in the film gate with which said projection lens barrel is aligned, and also for stabilizing the focal position and removing heat from the film feeding through said film gate past said light aperture, the improvement comprising means for providing a pressure enclosing chamber extending from said film gate and the film at said light aperture thereof to about the inner end portion of said aligned projection lens barrel, means on said curved film gate providing a transverse aperture of uniform height from the light aperture film gate surface to the surface of the film feeding thereby, and means providing and maintaining a uniform pressure within said chamber and against the surface of the feeding film at said light aperture while leaking air along the feeding film surface between said chamber and the atmosphere and maintaining said pressure by a current of air contacting and cooling said inner end portion of said projection lens barrel and said curved film gate.

13. Heat removing and film focus stabilizing means in a motion picture projecting apparatus having a curved film gate having a light aperture therethrough, means for feeding the film along curved film gate shoes extending longitudinally on opposite edges of said curved film gate and past the light aperture, film gate spring trap shoes maintaining the longitudinal opposite side edges of the feeding film against said curved film gate shoes and past said light aperture, and a lens mount having a projection lens barrel mounted in alignment with the film gate light aperture; said stabilizing means comprising a pressure enclosing chamber extending from about the inner end portion of said lens mount to said curved film gate and the film at said light aperture, a neck on the projection lens barrel extending through said lens mount into said pressure chamber, spaced cooling fins on said projection lens barrel neck, said curved film gate having a longitudinally curved, transversely flat recessed surface between said curved film gate shoes providing a transverse aperture of uniform height between said film gate recessed surface and said curved film gate shoes, on both sides of said film gate light aperture, and the adjacent curved surface of the feeding film, means for continuously providing a uniform air pressure different from atmospheric pressure in said pressure chamber, the transverse uniform apertures in said film gate leaking air along the curved surface of the feeding film between said air pressure chamber and the atmosphere.

14. The heat removing and film focus stabilizing means of claim 13, the pressure in said pressure chamber being greater than atmospheric pressure.

15. The heat removing and film focus stabilizing means of claim 13, the pressure in said pressure chamber being less than atmospheric pressure.

16. The heat removing and film focus stabilizing means of claim 13, the pressure on the concave surface of the feeding film being greater than the pressure on its opposite surface.

17. In a motion picture projector apparatus having a curved film gate having a light aperture therethrough, means for intermittently feeding the film along curved film gate shoes extending longitudinally on opposite edges of said curved film gate and past said light aperture, and film gate spring trap shoes maintaining the longitudinal opposite side edges of the feeding film against said curved film gate shoes and past said light aperture, the improvement comprising means for providing and maintaining a generally uniform pressure on that part of the film that is feeding past said light aperture for stabilizing the focus of the film feeding past said light aperture.

18. In the apparatus of claim 17, said means for stabilizing the focus of the film feeding past the light aperture providing a generally uniform but greater pressure on the concave side of the film feeding past the light aperture than on the convex side thereof.

19. In the apparatus of claim 17, said means for stabilizing the focus of the film feeding past the light aperture and providing and maintaining a generally uniform but greater pressure on the concave side of the film feeding past the light aperture than on the convex side of the feeding film and also means for leaking air through the light aperture and along the surface of the film feeding through said curved film gate between said curved film gate shoes.

20. In the apparatus of claim 19, said pressure providing and maintaining means causing air to leak from the atmosphere along the film surface and through the light aperture.

21. In the apparatus of claim 19, said pressure providing and maintaining means causing air to leak through the light aperture along the film surface to the atmosphere.

22. In the apparatus of claim 19, said pressure providing and maintaining means and also cooling a projection lens aligned with the light aperture by directing the path of the air that is maintaining the pressure to pass about the inner end portion of said projection lens as the air passes between the atmosphere and the maintained pressure.

References Cited by the Examiner

UNITED STATES PATENTS

| | | | |
|---|---|---|---|
| 1,082,678 | 12/1913 | Casler | 352—222 |
| 2,029,871 | 2/1936 | Johnson. | |
| 2,443,171 | 6/1948 | Tuttle | 352—146 X |
| 2,506,441 | 5/1950 | Charlin | 352—228 X |
| 2,691,320 | 10/1954 | Borberg | 352—222 X |
| 3,041,933 | 7/1962 | Emmel | 88—24 X |

FOREIGN PATENTS 746,664   7/1953   Germany.

JULIA E. COINER, *Primary Examiner.*

NORTON ANSHER, *Examiner.*

W. MISIEK, H. H. FLANDERS, *Assistant Examiners.*